United States Patent
Park

(10) Patent No.: US 7,773,177 B2
(45) Date of Patent: Aug. 10, 2010

(54) LIQUID CRYSTAL DISPLAY DEVICE COMPRISING A BLACK MATRIX INCLUDING CARBON PARTICLES COATED WITH AN INSULATING MATERIAL, METALLIC TITANIUM PARTICLES, AND A COLOR PIGMENT

(75) Inventor: Seung-Ryull Park, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 433 days.

(21) Appl. No.: 11/167,194

(22) Filed: Jun. 28, 2005

(65) Prior Publication Data

US 2006/0139516 A1 Jun. 29, 2006

(30) Foreign Application Priority Data

Dec. 28, 2004 (KR) .................. 10-2004-0114303

(51) Int. Cl.
*G02F 1/1333* (2006.01)
(52) U.S. Cl. ..................................... 349/110
(58) Field of Classification Search ............ 349/106, 349/110–111
See application file for complete search history.

(56) References Cited

U.S. PATENT DOCUMENTS

| | | | | |
|---|---|---|---|---|
| 5,117,299 A | * | 5/1992 | Kondo et al. ............ | 349/52 |
| 5,521,730 A | * | 5/1996 | Yoshida ................... | 349/116 |
| 5,558,927 A | * | 9/1996 | Aruga et al. ............. | 428/195.1 |
| 6,429,916 B1 | * | 8/2002 | Nakata et al. ............ | 349/106 |
| 6,461,775 B1 | * | 10/2002 | Pokorny et al. .......... | 430/7 |
| 6,525,791 B1 | * | 2/2003 | Tsuda et al. ............. | 349/106 |
| 6,900,861 B2 | * | 5/2005 | Yasui ....................... | 349/110 |
| 7,113,242 B2 | * | 9/2006 | Kim et al. ................ | 349/139 |
| 2003/0179325 A1 | * | 9/2003 | Rho et al. ................ | 349/43 |
| 2004/0263722 A1 | * | 12/2004 | Oh et al. .................. | 349/106 |

FOREIGN PATENT DOCUMENTS

| | | |
|---|---|---|
| JP | 09-236822 | 9/1997 |
| JP | 09-288281 | 11/1997 |
| JP | 10-253952 | 9/1998 |
| JP | 10-282484 | 10/1998 |
| JP | 2001-083315 | 3/2001 |

* cited by examiner

*Primary Examiner*—Andrew Schechter
*Assistant Examiner*—Charles Chang
(74) *Attorney, Agent, or Firm*—McKenna Long & Aldridge LLP

(57) ABSTRACT

Disclosed is a black matrix for a liquid crystal display device (LCD) having an impedance about equal to or more than $10^5 \Omega$, a specific resistance about equal to or more than $10^{11}$ $\Omega$cm, and a relative dielectric constant about equal to or less than 20 at a driving frequency of about 1 kHz to 100 kHz. The black matrix as disclosed has dielectric properties that minimize parasitic capacitance between the black matrix and the circuitry of the LCD, thereby preventing a signal delay in charging pixel electrodes that degrades the LCD image.

8 Claims, 5 Drawing Sheets

_US 7,773,177 B2_

LIQUID CRYSTAL DISPLAY DEVICE COMPRISING A BLACK MATRIX INCLUDING CARBON PARTICLES COATED WITH AN INSULATING MATERIAL, METALLIC TITANIUM PARTICLES, AND A COLOR PIGMENT

The present invention claims the benefit of Korean Patent Application No. 2004-0114303, filed in Korea on Dec. 28, 2004, which is hereby incorporated by reference for all purposes as if fully set forth herein.

BACKGROUND OF THE INVENTION

1. Field of the Invention

The present invention relates to a liquid crystal display device, and more particularly, to a liquid crystal display (LCD) device and a black matrix for a liquid crystal display device.

2. Discussion of the Related Art

Flat panel display devices have begun to replace cathode-ray tubes (CRTs) for information display. Various types of flat panel displays, such as liquid crystal display (LCD) devices, plasma display panels (PDPs), field emission displays (FED), and electro-luminescence displays (ELDs) have been developed to replace CRTs. Of these types of flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes proportionally with the intensity of the induced electric field into the direction of the induced electric field, thereby changing the light transmissivity of the LCD device. Thus, the LCD device displays images by varying the intensity of the induced electric field.

FIG. 1 is a cross-sectional view illustrating an LCD device according to the related art.

As illustrated in FIG. 1, the LCD device "LCD" includes an array substrate "AS", a color filter substrate "CS" and a liquid crystal layer 14.

The array substrate "AS" includes a first substrate 22 having a switching region "S", a pixel region "P" and a storage region "C", a thin film transistor "T" in the switching region "S" on the first substrate 22, a pixel electrode 17 in the pixel region "P", a storage capacitor "Cst" in the storage region "C," and gate and data lines 13 and 15 crossing each other to define the pixel region "P". The thin film transistor "T" includes a gate electrode 32, a semiconductor pattern 34, a source electrode 36 and a drain electrode 38. A passivation layer 40 is disposed on the thin film transistor "T". A storage capacitor "Cst" includes the gate line 13 and a storage electrode 30 overlapping the gate line 13.

The color filter substrate "CS" includes a second substrate 5, and a black matrix 6 corresponding to a gate line 13, a data line 15, and a thin film transistor T on the second substrate 5. The color filter substrate "CS" further includes red (R), green (G) and blue (B) color filter patterns 7a, 7b and 7c corresponding to the respective pixel regions P, and a common electrode 18 on the black matrix 6 and the color filter patterns 7a, 7b and 7c.

The above-described array substrate and the color filter substrate are aligned to each other and then attached. Once attached, there is a possibility of light leakage in the LCD device due to a misalignment between the two substrates. Accordingly, the black matrix has a margin of error to compensate for misalignment whereby the area of the black matrix is increased. However, an aperture ratio of the LCD device is reduced by a margin of error for the black matrix.

To improve the light leakage and the aperture ratio, a color filter on transistor (COT) type LCD device is used.

FIG. 2 is a cross-sectional view illustrating a COT type LCD device according to the related art.

As illustrated in FIG. 2, the COT type LCD device "LC" includes first and second substrates 50 and 90 attached by a sealant 80. A gate line 52 and a data line (not shown) cross each other to define a pixel region "P" on the first substrate 50. A thin film transistor "T" includes a gate electrode 53 on the first substrate 50, a gate insulating layer 56 on the gate electrode 53, a semiconductor pattern 58 on the gate insulating layer 56, and source and drain electrodes 60 and 62 on the semiconductor pattern 58. A gate pad electrode 54 and a gate pad electrode terminal 78 are disposed at one end of the gate line 52. A passivation layer 70 is disposed on the first substrate 50 having the thin film transistor "T".

Color filter patterns 72a and 72b and a black matrix "BM" are disposed on a passivation layer 70. The color filter patterns 72a and 72b includes a red (R) color filter pattern 72a, a green (G) color filter pattern 72b and a blue color filter pattern (not shown) correspond to the respective pixel region "P", and the black matrix "BM" corresponds to the thin film transistor "T". A planarization layer 74 is disposed on the first substrate 50 having the color filter patterns 72a and 72b and the black matrix "BM."

A pixel electrode 76 is disposed on the planarization layer 74 corresponding to the pixel region "P". The pixel electrode 76 and the gate pad electrode terminal 78 are made of a transparent conductive material.

A light shielding pattern 92 is disposed at peripheral portions of the second substrate 90, and a common electrode 94 is disposed on the second substrate 70 to induce a vertical electric field with the pixel electrode 76.

As described above, the color filter patterns and the thin film transistor are formed on the same substrate. Accordingly, a margin of error to compensate for misalignment during attachment of the first and second substrates is not required.

The related art black matrix corresponds to the thin film transistor, and thus it shields light otherwise incident on the semiconductor pattern of the thin film transistor. Further, the related art black matrix corresponds to the gate and data lines, and thus it shields light reflected from the gate and data lines and prevents a light leakage between the pixel electrodes and the gate and data lines. To do this, the related art black matrix is made of a black resin including carbon particles. A carbon particle has light absorbing characteristics. Accordingly, the light-shielding ability of the black matrix depends upon the density of carbon particles.

However, since the related art black matrix uses a carbon particle, it does not shield signal interferences between the thin film transistor, the gate line or the data line, which cause a parasitic capacitance with the thin film transistor, the gate line or the data line. This parasitic capacitance causes signal delay, which prevents the pixel electrode 76 from being properly charged for the purposes of generating an electric field.

FIG. 3 is a picture showing a screen of a related art COT type LCD device having a black matrix including carbon particles, and FIG. 4 is a waveform showing an input signal and an output signal of the related art COT type LCD device.

As illustrated in FIG. 3, upper portions of the screen are near to driving circuits supplying data signals. An input signal from the driving circuits is delayed along a downward direction, and thus pixel electrodes of the lower portions are not charged sufficiently. Accordingly, the upper portions are distinct, and lower portions get dimmer along a downward direction. As illustrated in FIG. 4, an input signal "W1" from the driving circuits is deformed into an output signal "W2" due to signal delay in the related art LCD device. As a result, a display quality of the related art LCD device is degraded.

SUMMARY OF THE INVENTION

Accordingly, the present invention is directed to a liquid crystal display device and black matrix for liquid crystal display device that substantially obviates one or more of the aforementioned problems due to limitations and disadvantages of the related art. In general, the present invention achieves this by providing a black matrix having dielectric properties that mitigate parasitic capacitance between the black matrix and LCD circuitry that causes signal delay and image degradation.

An advantage of the present invention is that it enhances the image quality of a liquid crystal device.

Another advantage of the present invention is that it reduces parasitic capacitance, and its effects, of a black matrix for a liquid crystal display device.

Another advantage of the present invention is that it improves the light blocking features of a black matrix for a liquid crystal display device.

Additional advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

The aforementioned and other advantages of the present invention are achieved with a liquid crystal display device, which comprises a first substrate; a second substrate substantially parallel to the first substrate; a plurality of gate and data lines crossing each other on the first substrate and defining a pixel region; a thin film transistor near a crossing portion of the gate and data lines; a color filter pattern corresponding to the pixel region; a pixel electrode corresponding to the pixel region; and a black matrix disposed on the thin film transistor, the black matrix having an impedance equal to about $10^5 \Omega$ or more, a specific resistance equal to about $10^{11}$ $\Omega$m or more, and a relative dielectric constant equal to about 20 or less at a driving frequency between about 1 kHz to 100 kHz In another aspect of the present invention, the aforementioned and other advantages are achieved by a resin for a black matrix for a liquid crystal display device, wherein the resin comprises a color pigment; and titanium particles.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of, this specification, illustrate embodiments of the invention and together with the description serve, to explain the principles of the invention.

DETAILED DESCRIPTION OF THE ILLUSTRATED EMBODIMENTS

Figure 1:
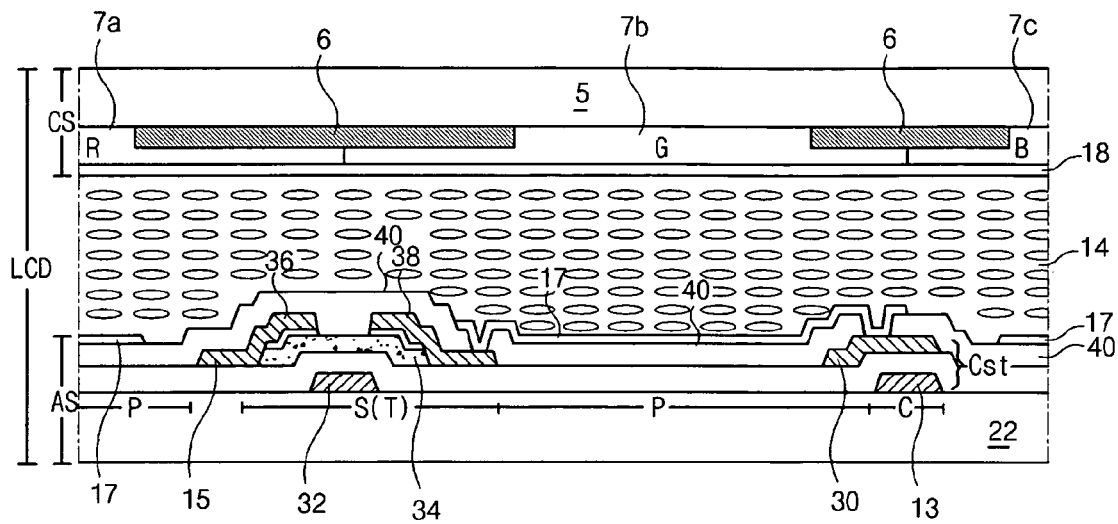
FIG. 1 is a cross-sectional view illustrating an LCD device according to the related art.

Reference will now be made in detail to the illustrated embodiments of the present invention, which are illustrated in the accompanying drawings.

In an exemplary embodiment of the present invention, a black matrix for an LCD device may be made of a black resin including at least one of the following: carbon particles coated with an insulating material, titanium particles, and a color pigment.

Reducing parasitic capacitance between the black matrix and the lines or electrodes adjacent to the black matrix, and thereby preventing signal delay, depends on black matrix properties such as its resistivity and dielectric constants. In particular, when the LCD device is driven by an alternating current (AC) voltage with a driving frequency of about 1 kHz to 100 kHz, among resistive properties, the impedance at the driving frequency may be more effective characteristic than a specific resistance. Accordingly, to optimize the impedance of the black matrix, it may be made of the black resin including at least one of carbon particles coated with the insulating material on their surfaces, titanium particles and a color pigment.

If a color pigment is used for the black matrix, at least one of bromine (Br), chlorine (Cl) and copper (Cu) may be further included in the black resin, and thereby excellent high resistive property and low dielectric property can be obtained.

If the color pigment is used for the black matrix, at least three of red, green, blue, violet and yellow pigments may be included in the black resin. In doing so, the quantity of the color pigments having higher light-transmissive property and higher dielectric property than above color pigments may be minimized. Further, a small quantity of the carbon particles coated with an insulating material may be included in the black resin having the color pigments, and thus the black matrix can have a high light-absorptive property with a small thickness. The black matrix having the color pigments may have a high light-transmittance i.e., a peak transmittance in at least one of long wavelength range (equal to or greater than 500 nm) and short wavelength range (equal to or less than 500 nm). Such light-transmissive property is created when the color pigment is used, however, the light-transmittance is very minute in comparison with the light-absorption. If the color pigment is used for the black matrix, a solvent such as propylene glycol monomethyl ether acetate (PGMEA) may be used to stably distribute the color pigments.

If the black matrix is made of a black resin having at least one of carbon particles coated with an insulating material, titanium particles and color pigments to give the black matrix a high resistivity and low dielectric property, the black matrix may have a thickness about equal to or more than 2 μm. In other words, if the related art black resin having carbon particles not coated with an insulating material is used for the black matrix, a light-absorption decreases as a wavelength increases from about 400 nm to 700 nm. Thus, a light-transmittance increases as the wavelength increases. However, if the carbon particles coated with the insulating material is used for the black matrix to obtain a high resistive and low dielectric property, the black matrix has a higher light-transmittance in a long wavelength than the related art black matrix using carbon particles not coated with the insulating material. Accordingly, to prevent the light leakage due to the higher light-transmittance, the black matrix may have a thickness about equal to or more than 2 μm.

Hereinafter, with reference to examples, electric properties of the black matrix for preventing signal delay and improving display quality according to the exemplary embodiment of the present invention are further described below.

Table 1 shows first experimental results of impedances and specific resistances of first to fifth black matrices in accordance with alternating current (AC) frequencies.

TABLE 1

| | Impedance (Rρ) [Ω] | | | specific resistance (ρ) [Ω cm] | poor display quality |
|---|---|---|---|---|---|
| | 1 kHz | 10 kHz | 100 kHz | | |
| BM-A | ~$10^7$ | ~$10^7$ | ~$10^6$ | ~$10^{12}$ | no |
| BM-B | ~$10^7$ | ~$10^6$ | ~$10^5$ | ~$10^{11}$ | no |
| BM-C | ~$10^7$ | ~$10^7$ | ~$10^5$ | ~$10^{13}$ | no |
| BM-D | ~$10^5$ | ~$10^4$ | ~$10^3$ | ~$10^9$ | yes |
| BM-E | ~$10^7$ | ~$10^6$ | ~$10^5$ | ~$10^{13}$ | no |

In Table 1, a first black matrix "BM-A" includes the carbon particle coated with the insulating material and the color pigment. A second black matrix "BM-B" includes the color pigment. A third black matrix "BM-C" includes the carbon particle coated with the insulating material and the color pigment, and the mixing ratio of the carbon particle coated with the insulating material and the color pigment in the third black matrix "BM-C" is different from the mixing ratio of the carbon particle coated with the insulating material and the color pigment in the first black matrix "BM-A". A fourth black matrix "BM-D" includes a carbon particle not coated with the insulating material. A fifth black matrix "BM-E" includes the color pigment, and a quantity of the color pigment in the fifth black matrix "BM-E" is different from a quantity of the color pigment in the second black matrix "BM-B".

As shown in Table 1, among the five black matrices, the display quality is poor only when the fourth black matrix is used. However, the display quality is good for other black matrices: the first, second, third and fifth black matrices BM-A, BM-B, BM-C and BM-E. With reference to Table 1, display quality is good for black matrices BM-A, BM-B, BM-C and BM-E which have an impedance of about $10^7 \Omega$ at 1 kHz, an impedance of about $10^6 \Omega$ to $10^7 \Omega$ at 10 kHz and an impedance of about $10^5 \Omega$ to $10^6 \Omega$ at 100 kHz. Further, display quality is good for the black matrices that have a specific resistance of at least approximately $10^{11}$ Ωcm. Accordingly, display quality is good in a driving frequency of about 1 kHz to 100 kHz for black matrices that have an impedance of at least approximately $10^5 \Omega$, and a specific resistance of at least approximately $10^{11}$ Ωcm. As a result, it is understood that the black matrix having such impedance and specific resistance can be effectively used for the COT type LCD device if the black matrix does not have a high light-transmittance.

Figure 5:
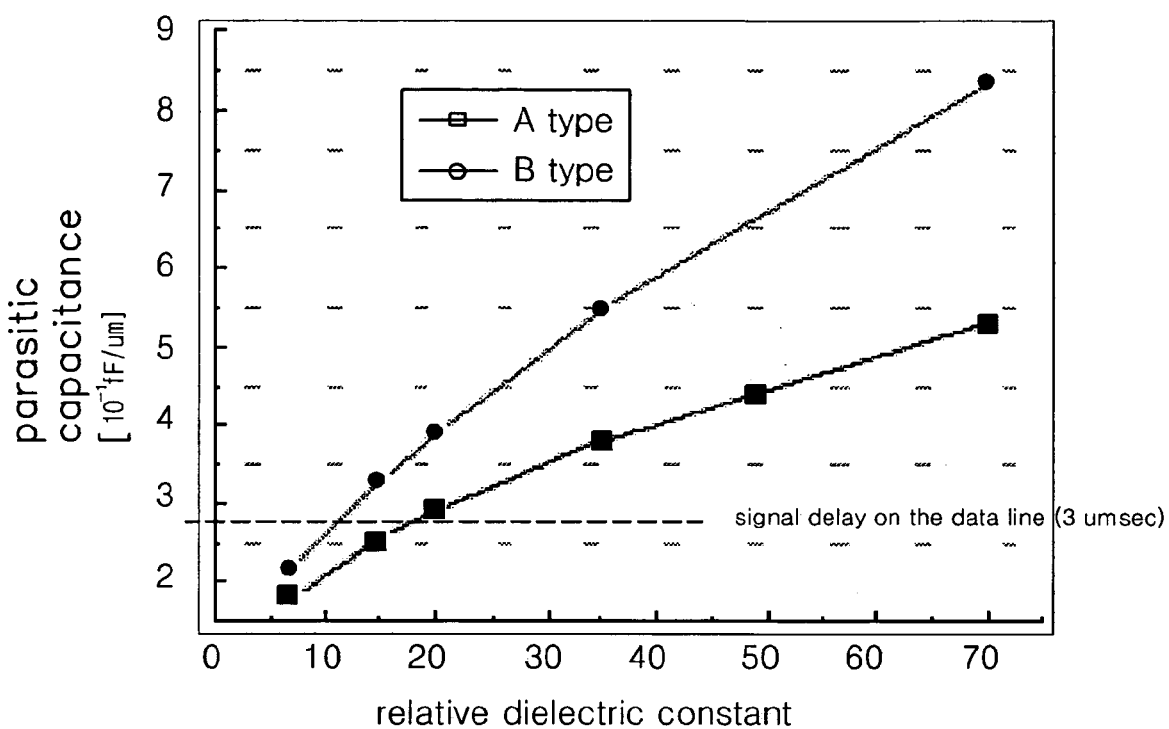
FIG. 5 is a graph illustrating a relative dielectric constant in accordance with a parasitic capacitance.

FIG. 5 is a graph illustrating parasitic capacitance as a function of relative dielectric constant. In FIG. 5, an "A" type LCD device is a COT type LCD device where an organic layer is not formed on the black matrix, and a "B" type LCD device is a COT type LCD device where an organic layer is formed on the black matrix.

As illustrated in FIG. 5, regardless of forming an organic layer on the black matrix, to obtain an acceptable parasitic capacitance between a data line and a pixel line such that a signal delay on the data line is equal to about 3 μm sec or less (which is a value to minimize a signal delay), the black matrix should have a relative dielectric constant equal to about 20 or less. For example, to minimize the signal delay, a relative dielectric constant may be equal to or less than 20 if the "A" type black matrix is used for the LCD device, and a relative dielectric constant may be equal to or less than 10 if the "B" type black matrix is used for the LCD device. Accordingly, regardless of forming an organic layer on the black matrix, to minimize a signal delay, it is understood that the black matrix may have the relative dielectric constant equal to about 20 or less.

Table 2 illustrates relative dielectric constants of first to fifth black matrices in accordance with alternating current (AC) frequencies.

TABLE 2

| | relative dielectric constant | | | poor display quality |
|---|---|---|---|---|
| | 1 kHz | 10 kHz | 100 kHz | |
| BM-1 | 5.59 | 5.40 | 5.14 | no |
| BM-2 | 167.87 | 137.01 | 126.57 | yes |
| BM-3 | 4.58 | 4.39 | 4.27 | no |
| BM-4 | 11.0 | 10.61 | 10.28 | no |
| BM-5 | 7.20 | 7.04 | 6.85 | no |

In Table 2, a first black matrix "BM-1" includes the carbon particle coated with the insulating material and the color pigment. A second black matrix BM-2 includes a carbon not coated with the insulating material. A third black matrix BM-3 includes the color pigment. A fourth black matrix BM-4 includes the carbon particle coated with the insulating material. The fifth black matrix BM-5 includes the carbon particle coated with the insulating material and the color pigment, and the mixing ratio of the carbon particle coated with the insulating material and the color pigment in the fifth black matrix BM-5 is different from the mixing ratio of the carbon particle coated with the insulating material and the color pigment in the first black matrix BM-1.

As shown in Table 2, among the five black matrices, the display quality is poor only when the second black matrix BM-2 is used. However, the display quality is good when other black matrices, the first, third, fourth and fifth black matrices BM-1, BM-3, BM-4 and BM-5, are used. In other words, if the display quality is good in a driving frequency of about 1 kHz to 100 kHz, it is understood that the black matrix may have the relative dielectric constant about equal to or less than 11.

As explained with regard to Tables 1 and 2, if the display quality is good, it is understood that the black matrix may have an impedance about equal to or more than $10^5 \Omega$, a specific resistance about equal to or more than $10^{11}$ Ωcm, and a relative dielectric constant about equal to or less than 20. To obtain such electric properties, the black matrix may be made of a black resin including at least one of carbon particles coated with an insulating material and color pigment, and further including the titanium material.

Figure 2:
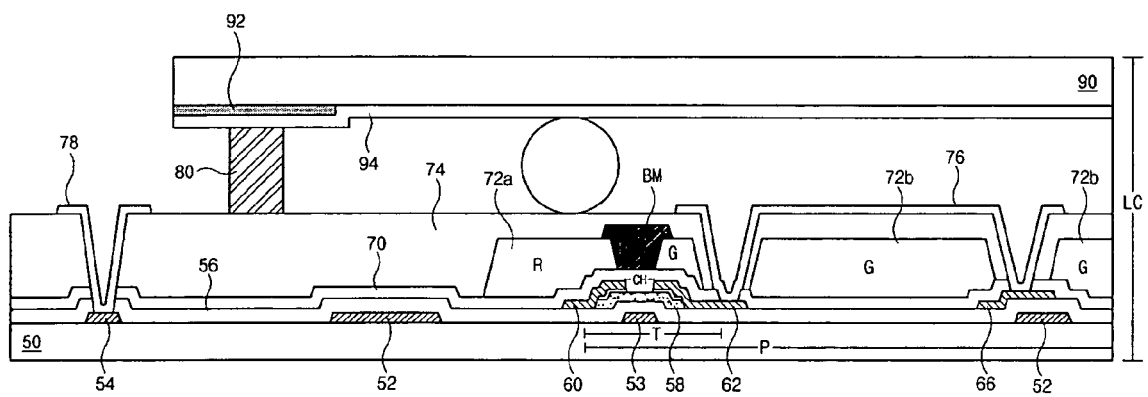
FIG. 2 is a cross-sectional view illustrating a COT type LCD device according to the related art.
Figure 3:
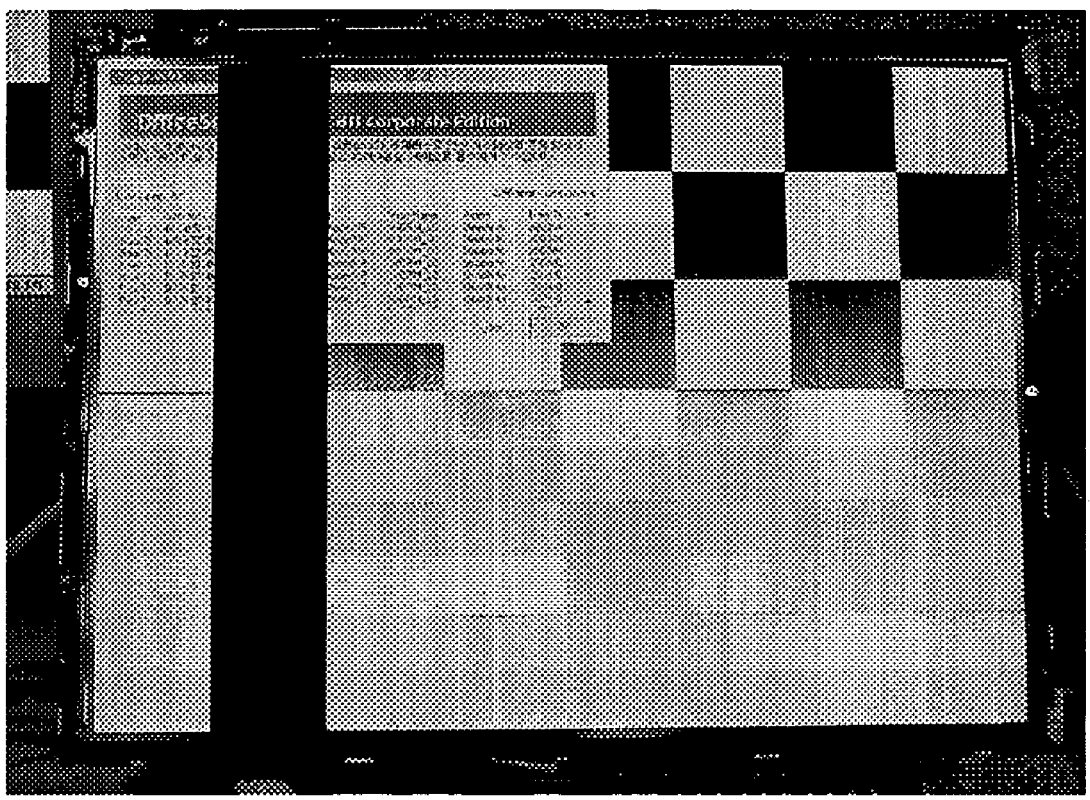
FIG. 3 is a picture showing a screen of the related art COT type LCD device having a black matrix including a carbon particle.
Figure 4:
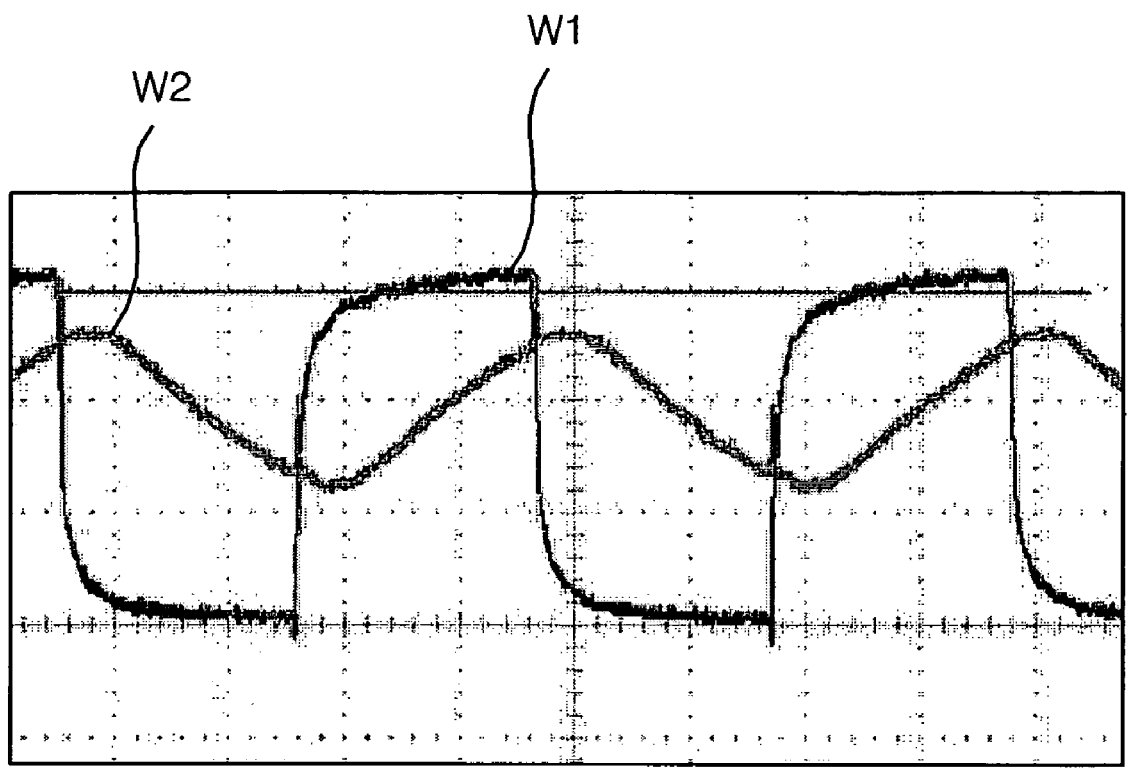
FIG. 4 shows an input signal waveform and an output signal waveform of the related art COT type LCD device.
Figure 6:
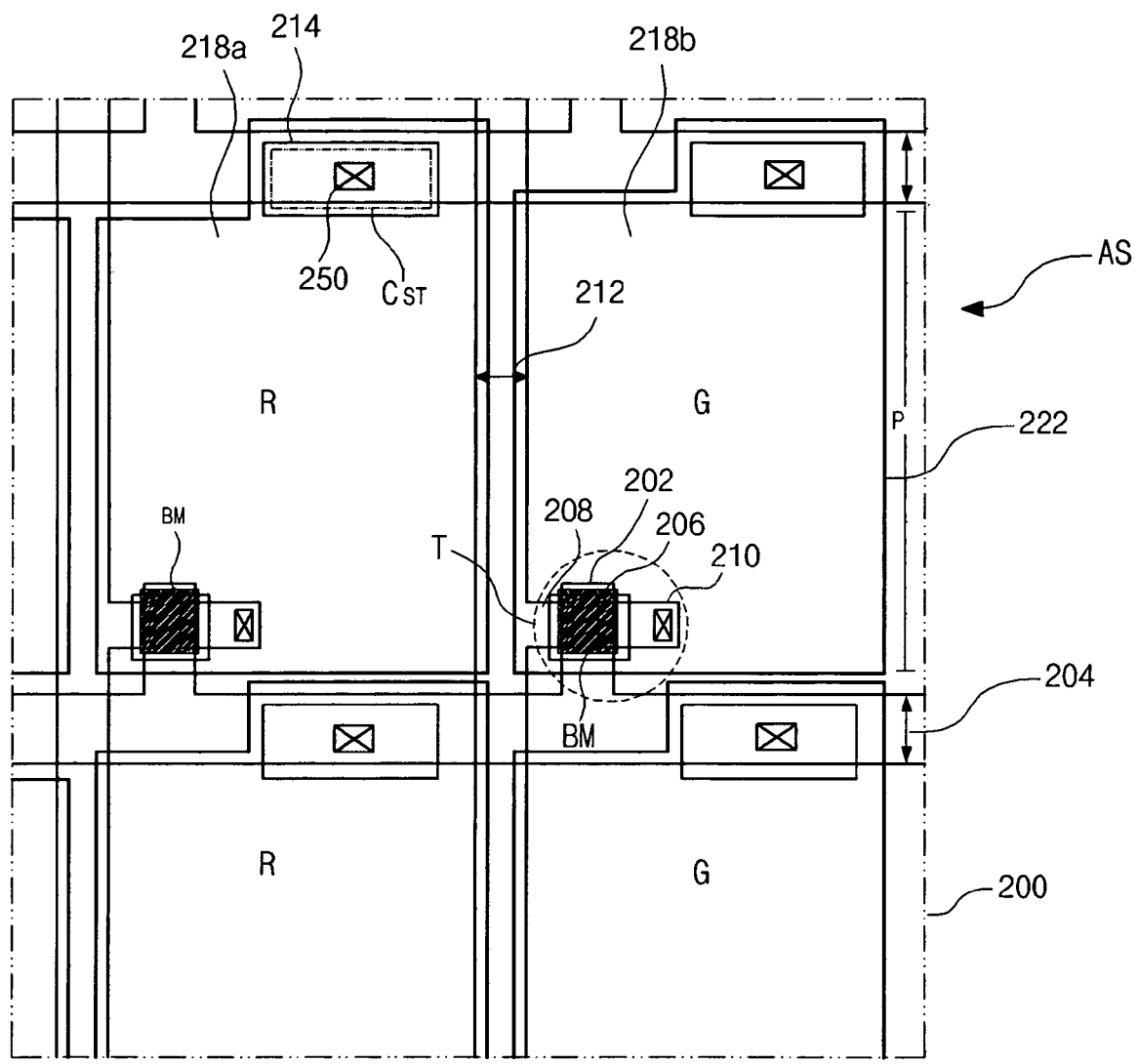
FIG. 6 is a plan view illustrating an array substrate for the COT type LCD device having an exemplary black matrix according to the present invention.

FIG. 6 is a plan view illustrating an array substrate for the COT type LCD device having an exemplary black matrix accordingly to an embodiment of the present invention. The array substrate may be similar to the array substrate of FIG. 2.

As illustrated in FIG. 6, an array substrate "AS" includes gate and data lines 204 and 212 crossing each other to define a pixel region "P" on a substrate 200. A thin film transistor "T" is disposed near a crossing portion of the gate and data lines 204 and 212. The thin film transistor "T" includes a gate electrode 202 on a substrate 200, a gate insulating layer (not shown) on the gate electrode 202, a semiconductor pattern 206 on the gate insulating layer and source and drain electrodes 208 and 210 on the semiconductor layer 206. A pixel electrode 222 is disposed in the pixel region "P." A red (R) color filter pattern 218a, a green (G) color filter pattern 218b and a blue color filter pattern (not shown) are disposed below the respective pixel electrodes 222. A storage electrode 214 defines a storage capacitor "$C_{ST}$" with the gate line 204 overlapping the storage electrode 214. The storage electrode 214 contacts the pixel electrode 222 through a storage contact hole 250.

The color filter pattern 218a or 218b may be made of a thick insulating resin and disposed on the gate and data lines 204 and 212. Accordingly, the pixel electrode 222 also may be disposed on the gate and data lines 204 and 212, and thus an aperture ratio of the LCD device can be increased. Further, a black matrix "BM" may be disposed on the thin film transistor "T", and the black matrix "BM" may be disposed corresponding to the storage contact hole 250. Further, the black matrix "BM" may be disposed corresponding to the gate and data lines 204 and 212.

In fabricating a COT type LCD device, the above array substrate "AS" is attached with an opposite substrate on which a common electrode is disposed.

In the exemplary embodiment of the present invention, the black matrix may be made of a black resin including at least one of the following: carbon particles coated with an insulating material, titanium particles, and a color pigment such that the black matrix may has an impedance equal to approximately $10^5 \Omega$ or greater, a specific resistance equal to approximately $10^{11}$ Ωcm or more, and a relative dielectric constant equal to about 20 or less. Accordingly, a parasitic capacitance can be minimized, and thus a signal delay can be minimized. The black matrix can be effectively used for the COT type LCD device, and display quality can be improved.

It will be apparent to those skilled in the art that various modifications and variations can be made in the LCD device and the black matrix for the LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate;
   a second substrate substantially parallel to the first substrate;
   a plurality of gate and data lines crossing each other on the first substrate and defining a pixel region;
   a thin film transistor near a crossing portion of the gate and data lines;
   a color filter pattern corresponding to the pixel region;
   a pixel electrode corresponding to the pixel region; and
   a black matrix disposed on the thin film transistor and including carbon particles coated with an insulating material and metallic titanium particles, the black matrix having an impedance equal to about $10^5 \Omega$ or more, a specific resistance equal to about $10^{11}$ Ωcm or more, and a relative dielectric constant equal to about 20 or less at a driving frequency between about 1 kHz and 100 kHz, wherein the black matrix includes a color pigment, and wherein the black matrix further includes at least one of bromine (Br) and chlorine (Cl).

2. The device according to claim 1, wherein the color pigment includes red, green, blue, violet and yellow pigments.

3. The device according to claim 1, wherein the color pigment includes at least three of red, green, blue, violet and yellow pigments.

4. The device according to claim 1, wherein the black matrix further includes a solvent.

5. The device according to claim 4, wherein the solvent includes propylene glycol monomethyl ether acetate (PGMEA).

6. The device according to claim 1, wherein the black matrix has a minimum thickness equal to about 2 μm.

7. The device according to claim 1, wherein the pixel electrode is disposed on the color filter pattern, and the pixel electrode and the color filter pattern overlap the gate line.

8. The device according to claim 1, wherein the black matrix is disposed on the plurality of gate lines and data lines.

* * * * *